Patented Mar. 10, 1942

2,275,620

UNITED STATES PATENT OFFICE 2,275,620

STABILIZATION OF SUPERPOLYMERS

Calvin S. Fuller, Chatham, N. J., assignor to Bell Telephone Laboratories, Incorporated, New York, N. Y., a corporation of New York No Drawing. Application September 8, 1939, Serial No. 293,951

5 Claims. (Cl. 260—75)

The present invention relates to the stabilization of synthetic linear condensation polymers of high molecular weight. More particularly, it relates to the stabilization of high molecular weight synthetic linear condensation polymers containing ester linkages in the linear chains of their molecules against decrease in molecular weight when exposed to the atmosphere at temperatures above the melting point of the polymers.

The simplest form of polymer containing ester linkages is the polyester. The preparation of polyesters and other linear condensation polymers of extremely high molecular weight has been described in the literature and in U. S. Patent 2,071,250 to W. H. Carothers. Polyesters of high molecular weight have been prepared by the reaction of a glycol with a dicarboxylic acid and also by the autoreaction of a hydroxy acid. In the case of preparation from a glycol and a dicarboxylic acid, an excess of glycol is commonly used. Therefore, the polyester molecules formed in this manner will presumably possess a hydroxyl group at each end. If an excess of neither reagent is employed, theoretically one-half of the molecular endings will be carboxyl groups and one-half would be hydroxyl groups. In the case of polymers formed by the autoreaction of hydroxy acids, each polymer molecule will necessarily have a carboxyl group at one end and a hydroxyl group at the other. According to the present invention, it has been discovered that the nature of the end groups of the polyester molecules is one of the most important factors in determining the stability of these substances.

When the polyesters are prepared under the proper conditions, the condensation reaction may be carried on until molecules of extremely high molecular weight are obtained. When the average molecular weight of these polymers is sufficiently high, they possess the property of cold drawing. When thin fibres formed from these materials are cold drawn by subjecting them to tensile stress, the fibres are permanently elongated and a change in the physical properties of the material takes place. The fibres usually become more transparent and increase in tensile strength and elasticity. X-ray examinations show that the crystals of the substances become permanently oriented in the direction of the fibre axis after such tensile stress is applied.

To possess the property of cold drawing which was described above, the polymers must possess a very high degree of polymerization. The degree of polymerization is indicated generally by the relative viscosity of the substance in dilute solution.

Relative viscosity is the ratio between the viscosity of the substance in a suitable solvent and the viscosity of the solvent itself. A convenient value can be obtained by comparing with the viscosity of chloroform the viscosity of a solution of 0.4 gram of the polymer in sufficient chloroform to form 100 cubic centimeters of solution.

The property of cold drawing begins to appear in synthetic linear condensation polymers when their relative viscosity, measured as above, exceeds about 1.2.

The region in which the cold drawing appears may also be expressed in terms of the average molecular weight of the polymer. The average molecular weight may be estimated by means of viscosity measurements according to the following relationship given by Staudinger in his book entitled "Die hochmolekularen organischen Verbindungen" (1932, Berlin):

$$\frac{n_r - 1}{C} = K_m M$$

where $n_r$ = relative viscosity of the solution,
$C$ = concentration of the solution in mols of the repeating group of the polymer per litre of solution,
$K_m$ = a constant characteristic of the series of polymers, and
$M$ = average molecular weight of the polymer.

Cold drawing begins to appear at an average molecular weight of about 7,000 but appears more definitely at about 8,000 to 10,000.

In making use of the polymers described above, as in molding, coating or impregnating operations, it is often necessary to maintain a pool of molten polymer in contact with the atmosphere for a considerable period of time. For instance, in the coating of electrical conductors or in the impregnation of fibrous coverings on electrical conductors, the conductors are continuously drawn through a bath of molten polymer. Considerable inconvenience and expense would be encountered if an attempt were made to exclude air from above the surface of the bath.

However, when polyesters have been exposed to the atmosphere at temperatures above their melting points, they have been found to decrease continuously in average molecular weight.

Polyesters which possess the property of cold drawing described above lose this desirable characteristic as their molecular weight decreases and also lose the characteristic toughness and flexibility of the superpolyesters.

According to the present invention, this molecular degradation of synthetic linear condensation polymers containing ester linkages is avoided by the addition to the polymers of stabilizing agents which are capable of preventing this action. It has been discovered that the addition of acylating agents to synthetic linear condensation polymers containing ester linkages and having hydroxyl end groups causes a material decrease in the rate of molecular degradation.

This stabilizing effect is apparently due to the elimination of the hydroxyl end groups of the polymer molecules by reaction with the acylating agents so as to form an end group made up of the hydrocarbon radical of the acylating agent joined to the polymer molecule by an ester linkage.

The molecular degradation of the polyesters when exposed to the atmosphere at high temperatures is believed to take place through the oxidation of the hydroxyl end groups of the molecules, thus forming aldehydic or acidic end groups and releasing water. The water thus formed is believed to attack the intermediate ester linkages of the polyester molecules, hydrolyzing them and causing the formation of a greater number of shorter molecules. The action of hydrolysis produces new hydroxyl groups which are capable of oxidation. Thus, a continuous cycle of oxidation and hydrolysis is established.

Replacement of the easily oxidizable hydroxyl groups by other end groups having a substantial resistance to oxidation at the temperatures of the molten polymers would, therefore, be expected to decrease the weight of molecular breakdown. Any suitable esterifying agent, such as the monobasic acids, monobasic acid anhydrides, and acyl halides may be employed for the purposes of the present invention. The esterifying agent may be added to the polymer in any suitable manner. For instance, the polymer and the stabilizing agent may be dissolved in a suitable solvent and the solvent may subsequently be evaporated. Alternatively, the stabilizing agent may be stirred into a body of molten polymer. The esterifying agent is preferably added in such an amount as will cause reaction with substantially all the hydroxyl end groups. Specific examples illustrating the manner in which the stability of polyesters is improved by treatment with the agents described above are given below.

*Example 1*

Commercial sebasic acid was purified by dissolving in methyl alcohol, boiling in the presence of charcoal, filtering, precipitating with water, filtering and drying. 404 grams of this acid was reacted under suitable conditions with 129 grams of glycol (5 per cent excess) to form a polyethylene sebacate having a relative viscosity of 1.342 as measured above in a 0.4 per cent solution. This polyester (250 grams) was dissolved in cold chloroform (400 cubic centimeters) and a mixture of 100 cubic centimeters of acetic anhydride and 100 cubic centimeters of glacial acetic acid added. This was allowed to stand overnight at room temperature. The chloroform solution was then washed free of most of the acetic acid with distilled water, after which the polyester was obtained from the chloroform solution by evaporating as thin films on plate glass at room temperature. The dry films were washed to neutral in distilled water by adding dilute alkali. Finally the sheets were rinsed and dried at 140° F. in an air oven. The final material had a relative viscosity of 1.344 which showed that no appreciable alteration in average molecule size was brought about by the acetylation. The initial polymer before treatment lost its property of cold drawing after being exposed to the atmosphere less than forty-eight hours at a temperature of 130° C. After acetylation the polymer retained its property of cold drawing even after exposure to the atmosphere at a temperature of 130° C. for more than seventy-two hours.

*Example 2*

The same procedure as in Example 1 was followed except that after the addition of the anhydride acid mixture the solution was heated on the steam bath for one hour. In this case the original relative viscosity of 1.41 was increased to 1.48 after the acetylation. This indicates that in addition to its action as an esterifying agent, the acid anhydride acts as a powerful dehydrating agent and causes further polyesterification to take place. The initial polymer before treatment lost its property of cold drawing when heated in contact with the atmosphere at a temperature of 130° C. for less than twenty-four hours. The acetylated polymer was capable of being cold drawn even after exposure under similar conditions for more than seventy-two hours.

*Example 3*

Acetic anhydride was added directly to molten polyethylene sebacate of relative viscosity 1.51 and intimately stirred in. The mass was heated at 130° C. for one hour and then subjected to vacuum at this temperature to remove acetic acid and residual anhydride. The final material showed a much increased toughness and a relative viscosity of 1.68. Propionic, butyric and caproic anhydrides showed a similar behavior. Improved heat stability comparable to that described in the preceding two examples was observed in all cases.

*Example 4*

A chloroform solution of polyethylene sebacate was treated with benzoyl chloride in excess of the amount calculated as required to esterify the hydroxyl end groups. Upon removal of the solvents and excess chloride and testing, improved heat stability of the melted polyester was observed.

*Example 5*

A polyethylene sebacate was prepared in the presence of acetic anhydride as follows: 10.1 grams of distilled sebacic acid was heated at 250° C. with 3.3 grams of pure ethylene glycol in a stream of dry hydrogen gas into which acetic anhydride vapor was introduced after 90 per cent of the theoretical amount of water had been collected. The reaction soon reached completion, giving an acetylated product having improved stability to heat. By this method the esterification reaction can be stopped at any desired average molecular weight, depending on the reaction stage at which the anhydride is introduced.

The stabilizing treatments described in the preceding examples give similar results when applied to other polyesters, as, for instance, the polymers derived from succinic acid and ethylene glycol, adipic acid and decamethylene glycol, sebacic acid and decamethylene glycol, sebacic acid and diethylene glycol, azelaic acid and ethylene glycol, succinic acid and hexamethylene glycol and the polymer derived from the autoreaction of 10-hydroxy decanoic acid. Copolyesters, when similarly treated, also show improved stability. As examples of copolyesters which may be so treated may be mentioned the polymers derived from the reaction of ethylene glycol, propylene glycol, and sebacic acid and from ethylene glycol, diethylene glycol and sebacic acid. The stabilization of other linear condensation polymers containing ester linkages in the linear chain, such as copolymers containing both ester and amide linkages, may be effected in the same manner. Examples of such polymers which may be stabilized are the polymers derived from decamethylene diamine, decamethylene glycol and sebacic acid, from decamethylene diamine, ethylene glycol and sebacic acid, from propylene diamine, ethylene glycol and duodecamethylene dicarboxylic acid, and from ethanolamine and sebacic acid.

In the specific examples given above, stabilization has been described as being effected by the formation of hydrocarbon radicals linked to the polymer molecule by an ester linkage. However, stabilization may be brought about by the formation of any end group resistant to oxidation and linked in any other suitable manner to the polymer molecule. Thus, hydrocarbon radicals linked to the polymer molecule by ether linkages formed by the alkylation of the hydroxyl end groups will also be effective. Aliphatic, aromatic, araliphatic or cycloaliphatic radicals are satisfactory. In general, any end group substantially incapable of oxidation when the polymer is in contact with the atmosphere at a temperature just above its melting point will be suitable for the purposes of the present invention.

Stabilized polymers prepared by any of the general procedures described above may be used directly in forming a molten bath for the coating or impregnation of electrical conductors or other articles. The electrical conductor may be drawn continuously through the pool of molten polymer which is in contact with the atmosphere and periodically additional amounts of molten polymer may be added to the bath. The stability of the polymer insures a coating on the conductor which has not lost the desirable properties of the superpolymers even though the bath may be exposed to the atmosphere for many hours.

The invention has been described in terms of its specific embodiments but it is to be understood that it is of general application and is to be limited only by the scope of the appended claims.

What is claimed is:

1. A cold drawing polyester which resists molecular degradation when exposed to the atmosphere at temperatures above its melting point, the condensation linkages of which consist essentially of ester linkages of the formula

said polyester having substantially all of its hydroxyl groups converted by esterification to ester groups of the structural formula

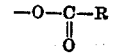

where R is a hydrocarbon radical.

2. A cold drawing polyester which resists molecular degradation when exposed to the atmosphere at temperatures above its melting point, the condensation linkages of which consist essentially of ester linkages of the formula

said polyester having substantially all of its hydroxyl groups converted by esterification to acetate groups.

3. A cold drawing polyester which resists molecular degradation when exposed to the atmosphere at temperatures above its melting point, the condensation linkages of which consist essentially of ester linkages of the formula

said polyester having substantially all of its hydroxyl groups esterified with acetic anhydride.

4. A coating or impregnating bath comprising a molten bath of the polyester described in claim 3.

5. A linear polyester, the condensation linkages of which consist essentially of ester linkages of the formula

said polyester having a molecular weight in excess of about 8,000 and having substantially all of its hydroxyl groups esterified with an ester-forming compound which produces ester groups of the formula

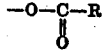

where R is a hydrocarbon radical said polyester being resistant to molecular degradation when exposed to the atmosphere at temperatures above its melting point.

CALVIN S. FULLER.